United States Patent
Hamrick

(10) Patent No.: US 7,114,840 B2
(45) Date of Patent: Oct. 3, 2006

(54) EXIT SIGN ILLUMINATED BY SELECTIVE COLOR LEDS

(76) Inventor: Douglas Hamrick, 7652 Eagle Dr., Pickerington, OH (US) 43147

( * ) Notice: Subject to any disclaimer, the term of this patent is extended or adjusted under 35 U.S.C. 154(b) by 0 days.

(21) Appl. No.: 10/764,595

(22) Filed: Jan. 23, 2004

(65) Prior Publication Data

US 2004/0170015 A1    Sep. 2, 2004

Related U.S. Application Data

(60) Provisional application No. 60/465,822, filed on Apr. 25, 2003.

(51) Int. Cl.
*F21V 7/04*     (2006.01)
*G09F 13/18*    (2006.01)

(52) U.S. Cl. .............. 362/613; 362/231; 362/330; 362/601; 362/812; 40/570; 40/581; 340/332; 340/815.45; 340/815.56; 340/815.65

(58) Field of Classification Search ............. 362/31, 362/230–231, 240–241, 249, 362, 367, 812, 362/600–601, 611–613, 630–634, 330; 40/570, 40/581; 340/815.45, 332, 815.49, 815.53, 340/815.56, 815.65
See application file for complete search history.

(56) References Cited

U.S. PATENT DOCUMENTS

| | | | | |
|---|---|---|---|---|
| 4,271,408 A * | 6/1981 | Teshima et al. | .............. | 345/83 |
| 4,435,743 A * | 3/1984 | Plumly | .............. | 362/20 |
| 5,018,290 A * | 5/1991 | Kozek et al. | .............. | 40/570 |
| 5,027,258 A * | 6/1991 | Schoniger et al. | .............. | 362/31 |
| 5,075,826 A * | 12/1991 | Lan | .............. | 362/541 |
| 5,276,591 A * | 1/1994 | Hegarty | .............. | 362/31 |
| 5,303,124 A * | 4/1994 | Wrobel | .............. | 362/20 |
| 5,365,411 A * | 11/1994 | Rycroft et al. | .............. | 362/20 |
| 5,388,357 A * | 2/1995 | Malita | .............. | 40/570 |
| 5,410,453 A * | 4/1995 | Ruskouski | .............. | 362/20 |
| 5,446,440 A * | 8/1995 | Gleason et al. | .............. | 340/331 |
| 5,448,843 A * | 9/1995 | Schwartz | .............. | 40/570 |
| 5,459,955 A * | 10/1995 | Ruskouski et al. | .............. | 40/570 |
| 5,463,280 A * | 10/1995 | Johnson | .............. | 315/187 |
| 5,485,145 A * | 1/1996 | Sniff | .............. | 340/815.4 |
| 5,526,236 A * | 6/1996 | Burnes et al. | .............. | 362/20 |
| 5,526,251 A * | 6/1996 | Andre et al. | .............. | 362/396 |
| 5,539,623 A * | 7/1996 | Gurz et al. | .............. | 362/20 |

(Continued)

*Primary Examiner*—Alan Cariaso
*Assistant Examiner*—Jason Han

(57) ABSTRACT

An exit sign comprising a housing and a plurality of red and green color LEDs having the capability of being selectively activated to produce either red light or green light. The plurality of LEDs are mounted in a mutual lighting association in the housing. A switch is manually operable to selectively activate the plurality of red color LEDs to produce the red light and in the alternative, to selectively activate of the plurality of the green color LEDs to produce the green light. Means for passing light from the selected red light or selected green light in the form of indicia symbolizing an exit enables viewing by an observer, such means include a stencil having four independent letters forming the word EXIT. DC circuitry is in operative electrical connection with the plurality of LEDs. A source of DC electrical power activates the DC circuitry. The plurality of LEDs can be monochrome red LEDs and monochrome green LEDs or in the alternative, the plurality of LEDs can be bicolor LEDs having the capability of producing red light or green light. Red light and green light can be simultaneously emitted so as to produce yellow light. An emergency power backup battery is connected to the plurality of color LEDS. Means for producing emergency light is optional.

38 Claims, 10 Drawing Sheets

U.S. PATENT DOCUMENTS

| | | | |
|---|---|---|---|
| 5,542,201 A * | 8/1996 | Grondal et al. ............... 40/570 |
| 5,575,459 A * | 11/1996 | Anderson ................... 362/240 |
| 5,611,163 A * | 3/1997 | Smith .......................... 40/570 |
| 5,640,792 A * | 6/1997 | Smith et al. .................. 40/546 |
| 5,697,175 A * | 12/1997 | Schwartz ..................... 40/552 |
| 5,727,862 A * | 3/1998 | Wu ............................. 362/27 |
| 5,775,016 A * | 7/1998 | Chien .......................... 40/544 |
| 5,797,673 A * | 8/1998 | Logan et al. ............... 362/234 |
| 5,823,378 A * | 10/1998 | Evarts et al. ................ 220/374 |
| 5,949,347 A * | 9/1999 | Wu ....................... 340/815.45 |
| 5,988,825 A * | 11/1999 | Masters et al. ............... 362/20 |
| 6,019,477 A * | 2/2000 | Wegrzyn et al. .............. 362/20 |
| 6,023,869 A * | 2/2000 | Durbin ........................ 40/544 |
| 6,026,602 A * | 2/2000 | Grondal et al. ............... 40/570 |
| 6,036,336 A * | 3/2000 | Wu ............................. 362/249 |
| 6,072,280 A * | 6/2000 | Allen ..................... 315/185 S |
| 6,106,126 A * | 8/2000 | Neustadt ....................... 362/20 |
| 6,142,648 A | 11/2000 | Logan et al. |
| 6,149,283 A * | 11/2000 | Conway et al. ............. 362/236 |
| 6,167,648 B1 * | 1/2001 | Dimmick ..................... 40/564 |
| 6,183,086 B1 * | 2/2001 | Neubert ...................... 351/221 |
| 6,240,665 B1 * | 6/2001 | Brown et al. ................. 40/570 |
| 6,268,801 B1 * | 7/2001 | Wu ....................... 340/815.45 |
| 6,367,179 B1 * | 4/2002 | Marsh ......................... 40/570 |
| 6,415,531 B1 * | 7/2002 | Ohtsuki et al. ................ 36/31 |
| 6,471,388 B1 * | 10/2002 | Marsh ....................... 362/559 |
| 6,499,866 B1 | 12/2002 | Logan et al. |
| 6,502,956 B1 * | 1/2003 | Wu ............................ 362/237 |
| 6,539,657 B1 * | 4/2003 | Qualls et al. ................. 40/546 |
| 6,567,010 B1 * | 5/2003 | Lin et al. ............... 340/815.67 |
| 6,741,324 B1 * | 5/2004 | Kim ........................... 362/249 |
| 2003/0133292 A1* | 7/2003 | Mueller et al. ............. 362/231 |

* cited by examiner

EXIT SIGN ILLUMINATED BY SELECTIVE COLOR LEDS

RELATED U.S. APPLICATION DATA

This patent application claims benefit of U.S. Provisional Application No. 60/465,822 filed on Apr. 25, 2003 entitled, "Tri-Color LED Lamp for Illuminated Signage".

FIELD OF THE INVENTION

The present invention relates generally to color light emitting diode lamps used in illuminated signs, and more particularly to illuminate emergency exit signs.

BACKGROUND OF THE INVENTION

Originally, an exit sign used standard incandescent lamps. The earliest alternatives to incandescent lamps were radioactive tritium gas and compact fluorescent lamps. In 1985, light-emitting diodes (LEDs) were introduced for use in exit signs.

The most cost-effective alternative today over the exit signs that use incandescent lamps are LED exit signs. A standard LED exit sign generally uses only about 1 to 5 watts of power per surface and costs less than $5.00 per year to operate depending on the model and local utility costs. Because LEDs also last considerably longer than incandescent lamps, life cycle savings are dramatic. When an LED exit sign is used instead of an incandescent exit sign, the cost saving multiple over a ten-year period including initial costs, energy expenditures, and maintenance requirements will be in the range of five times.

There are currently several different types of LED exit signs available in the marketplace using a variety of LEDs in different configurations. There are a great number of LED sign manufacturers competing in the market. As a result, there is a wide range in price, quality, and energy consumption. Some LED signs use as few as 6 LEDs, others use 18 to 35 LEDs, and some use up to 200 LEDs. The rated energy consumption can thus range from as little as 1 watt up to 8 watts.

Under National Fire Protection Association (NFPA), National Electrical Code (NEC), Underwriters Laboratories (UL) and local fire and building codes for each state, buildings that provide public access are required by law to have signs therein identifying the exits. These emergency signs are required to exhibit a specific amount of illumination and often times are required to have an emergency backup power source to provide emergency illumination to the exit sign for a specified period of time when electrical power to the building is interrupted to allow sufficient time for persons in the building to vacate. LED exit signs are presently available primarily with red or green color LEDs, or other approved colors as required by local ordinances or municipalities and depending on state and city codes.

No LED exit sign presently exists that is commercially manufactured to the best of my knowledge that provides a choice of either red or green color LEDs along with a switch to select the color of the exit sign indicia that is legally required by the particular jurisdiction. In the selective color LED lamp of the present invention, the switch can selectively turn on the red color LEDs to produce a red color exit sign indicia, or selectively turn on the green color LEDs to produce a green color exit sign indicia. In addition, the LED lamp of the present invention can selectively turn on both the red and green color LEDs simultaneously to produce a yellow color exit sign indicia. Exit signs usually include a stencil having perforations that define indicia through which the LED light passes and which is readable by an observer. Existing stencil signs have solid colored green or red diffuser panels behind opaque sections with the letters EXIT cut out. Other exit signs can include a stencil manufactured out of a clear lens with the indicia or background masked with a red, green, or other color ink. The word EXIT is usually white in this case against the color background. The indicia generally form the letters of the word EXIT and include removable or permanent chevron arrows located on opposite sides of the word EXIT. Other words, symbols, or idiogram indicia can indicate an exit. Among these are words or symbols in non-English speaking countries that have an analogous meaning to the word EXIT in English.

The present invention provides an LED lamp that enables a user to selectively, or optionally, produce distinct color outputs. The selective color LED lamp is designed for use in illuminated signs generally including emergency exit signs, but also other types of illuminated signs that can be used in different locations. The use of the selective color LED lamp will allow the emergency signage to comply with all local fire and building code requirements. An LED exit sign manufacturer, wholesaler, and retailer can stock only one basic version of the selective color LED lamp exit sign thereby reducing manufacturing, inventory, and shipping costs. The selective color LED lamp is designed to replace existing incandescent and single color LED lamps. It can be used directly in sockets of existing emergency exit signs as retrofit LED lamps, or as the main light source in new emergency exit signs and other illuminated signs. Besides using the selective color LED lamp of the present invention in emergency exit signs, the selective color LED lamp can be used in illuminated advisory, directional, instructional, warning, and safety demarcation signs. In the latter uses, other selective colors can be used other than the red, green, and yellow colors of the selective color LED lamp. Another area where the selective color LED lamp of the present invention can be used is in warning and instructional lighting markers used in many truck-loading docks around the country.

It is an object of the present invention to provide a selective color LED lamp wherein one of the color red or the color green can be selected for general signage lighting applications incorporating light emitting diodes as the main light source for use in existing and newly manufactured signage lighting fixtures.

Another object of the present invention is to provide such a selective color LED lamp that can readily replace the incandescent and compact fluorescent lighting units offering energy efficiency, longer life with zero mercury, zero disposal costs, and zero hazardous waste. The present invention can be used with all types of illuminated signage.

Yet another object of the present invention is to provide a selective color LED lamp that will easily produce a red color or green color while substantially using a low number of color LEDs wherein such use is in the field of emergency exit signs.

Yet another object of the present invention is to provide a selective color LED lamp that will easily produce a red color or green color or a mixed red and green color to produce the color yellow while using a relatively low number of colored LEDs wherein such use is in the field of emergency exit signs.

A further object of the present invention is to provide a selective color LED retrofit lamp containing integral electronic circuitry that can be readily and economically fabricated from simple electronic components for easy adaptation for use with existing illuminated signage.

And yet a further object of the present invention is to provide a selective color LED lamp combined with surge suppression, uniform illumination, battery backup, and low power consumption to be readily and economically fabricated from simple components, for use in newly manufactured and multipurpose illuminated emergency signage that is readily adaptable to comply with fire and building code.

A final object of the present invention is to provide a selective color LED lamp for use in newly manufactured illuminated signage with optional emergency lights integrally and operationally mounted with the main lamp unit.

BRIEF SUMMARY OF THE INVENTION

The selective color retrofit LED lamp comprises an array of red color LEDs and an array of green color LEDs, each LED in each array is connected in a series and parallel relationship with similar color LEDs. Alternating current (AC) voltage is converted to direct current (DC) voltage by bridge rectifiers to power the LEDs. Switches will be provided to turn on or to select for operation only the array of red color LEDs or only the array of green color LEDs. Optionally, both arrays of red and green color LEDs can be turned on to emit light at the same time, the latter selection resulting in the production of the color yellow. The LEDs are mounted onto a rigid circuit board with or without an external housing. The AC power to the selective color retrofit LED lamp can terminate in any standard lamp configuration including, but not limited to bi-pin, medium screw base, candelabra base, etc. This selective color retrofit LED lamp can be used in single and double panel mount exit signs, edge mount exit signs, stencil exit signs, panel mount exit signs fitted with emergency lights, and other illuminated signage.

The selective color LED lamp of the present invention can be used in newly manufactured illuminating signage as well. This selective color LED lamp in combination with a number of other components including a step-down transformer to convert 120/220/277 VAC to a lower voltage to power the LEDs and to serve as a voltage suppresser; a battery backup system with testing capability that is charged by the AC power input; a fixture housing or body; a fixture mount; background stencil and lettering or symbol indicia; at least one optical diffuser; and optional integral emergency lights, all combine to form a selective color LED illuminating sign of the present invention.

U.S. Pat. No. 6,567,010 issued to Lin and Zhu on May 20, 2003, discloses a traffic signal head with individual activation of 1) red light LED generating elements and green light LED generating elements, and 2) red light LED generating elements and green light LED generating elements with simultaneous activation of the red and green light LED generating elements producing yellow light. The two main claims in Lin set forth the combination of the individual activations of red, green, and yellow light, a housing, activation circuitry, and the inventive feature of circuitry for enabling adjustment of the relative intensity of the yellow light produced by the activation of the red and green light.

However, Lin does not disclose, as does the present invention a combination of elements that includes means for passing selected red light or selected green light from an array of red LEDs and an array of green LEDs in the form of indicia symbolizing an exit and enabling viewing by an observer. Nor does Lin disclose means for optically diffusing the selected red light or selected green light positioned in the housing between the array of red LEDs and the array of green LEDs positioned in the housing, and the means for passing light in the form of indicia. The present invention includes yellow light produced by the simultaneous production of red and green light that also passes through the indicia symbolizing an exit. There is no adjustment of the relative intensity of the yellow light. The selected red light or green light is full on or full off resulting in a yellow light that is either full on or completely off only.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention, and what is presently considered and believed to be the best mode of practice in the principles thereof.

DETAILED DESCRIPTION OF THE INVENTION

Figure 1:
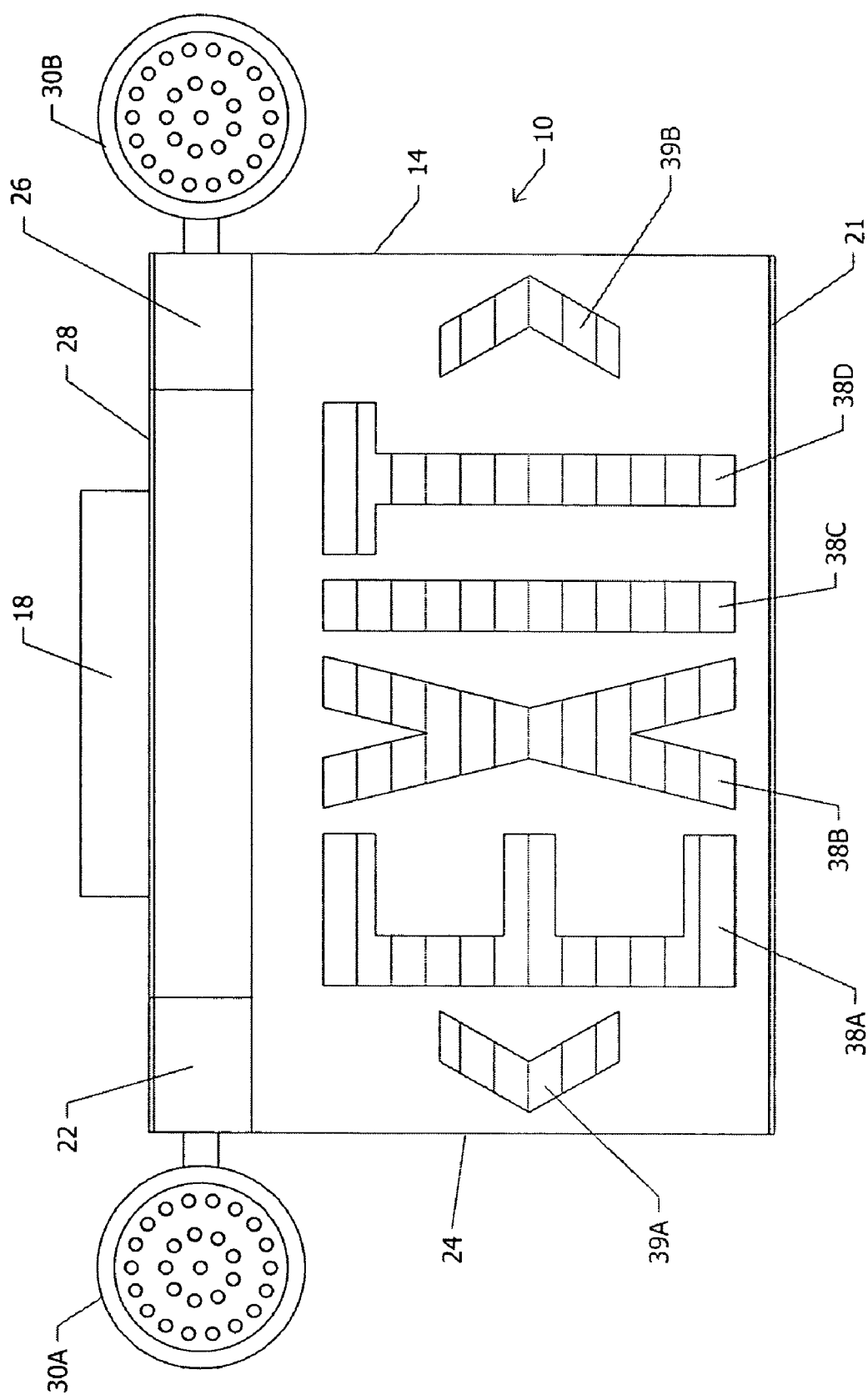
FIG. 1 shows a front view of an assembled selective color LED exit sign in accordance with the present invention.

Reference is now made to the drawings and in particular to FIGS. 1–6 in which identical or similar parts are designated by the same or similar reference numerals throughout.

A selective color light emitting diode (LED) sign 10 is shown in FIG. 1–6 and in particular in assembled front view in FIG. 1. Sign 10 includes disassembled elements shown in FIGS. 1A, 1B, 1C, and 1D.

Figure 1A:
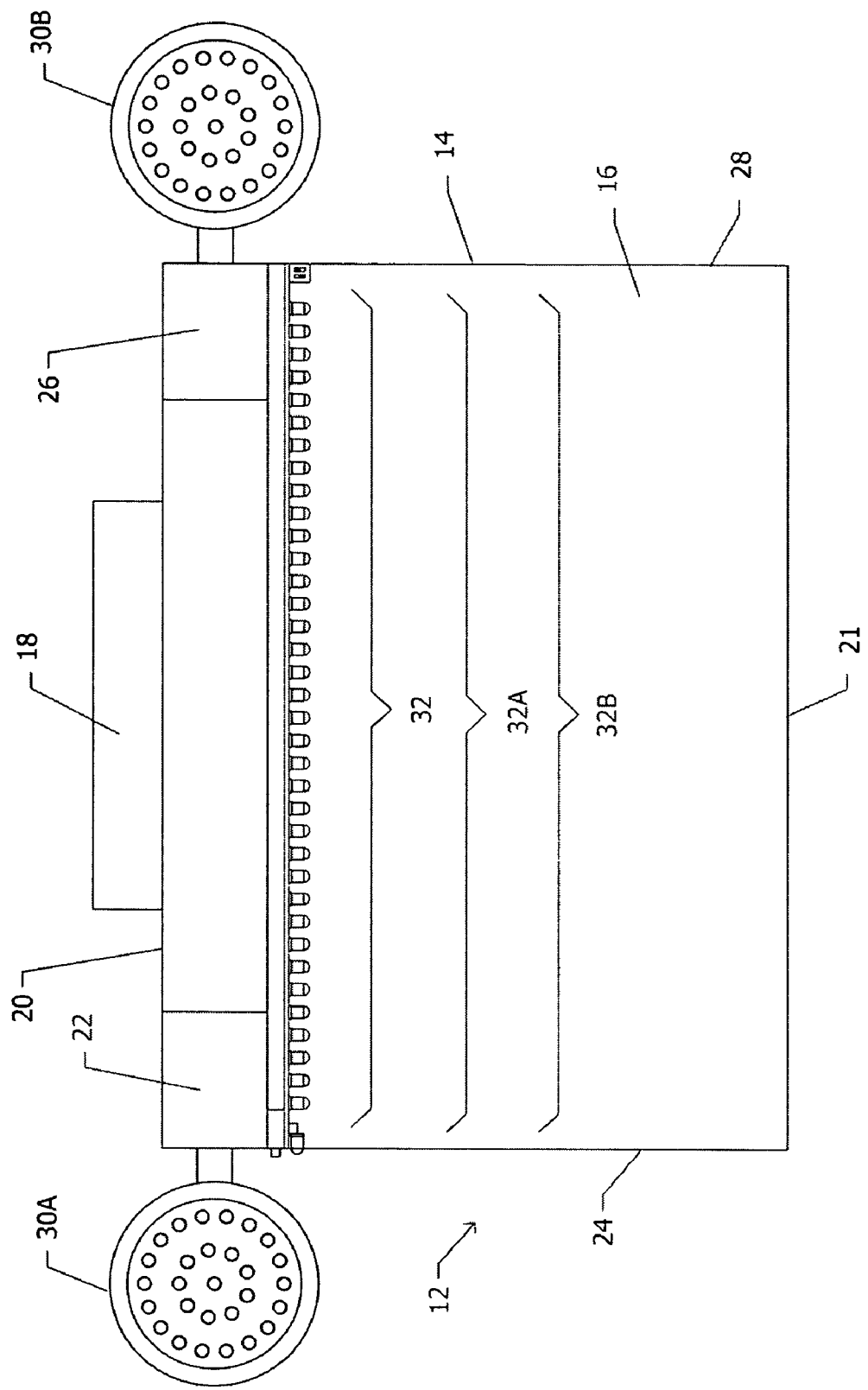
FIG. 1A shows the basic mount structure for the selective color LED exit shown in FIG. 1 along with two attached emergency lights along with LED lamps mounted thereto.

In particular, FIG. 1A shows a disassembled front view 12 of sign 10 comprising a housing 14 and a flat rear panel 16 mounted thereto. A canopy 18 attached to the top edge 20 of housing 14 provides support for hanging the entire sign 10 to a ceiling structure (not shown). A step-down transformer 22 is mounted at top edge 20 at one side edge 24 of housing 14 opposite bottom edge 21 and a rechargeable backup battery 26 is mounted at top edge 20 at the opposed side edge 28 of housing 14. Optional emergency lights 30A and 30B are attached to housing side edges 24 and 28 respectively. An array of thirty-six monochrome color LEDs 32 are horizontally mounted in a manner known in the art at equal intervals across the area of top edge 20 of flat rear panel 16 between side edges 24 and 28.

Figure 1B:
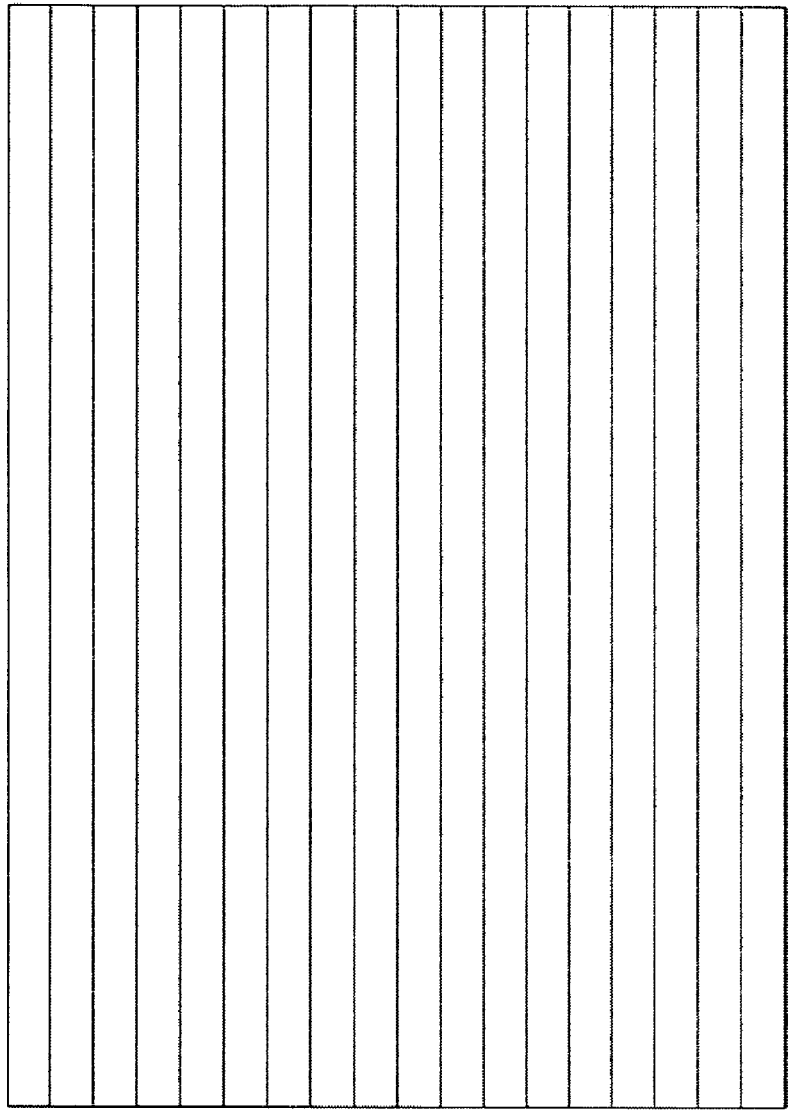
FIG. 1B shows an optical diffuser of the selective color LED exit sign shown in FIG. 1 before being mounted to the mount structure shown in FIG. 1A.
Figure 1C:
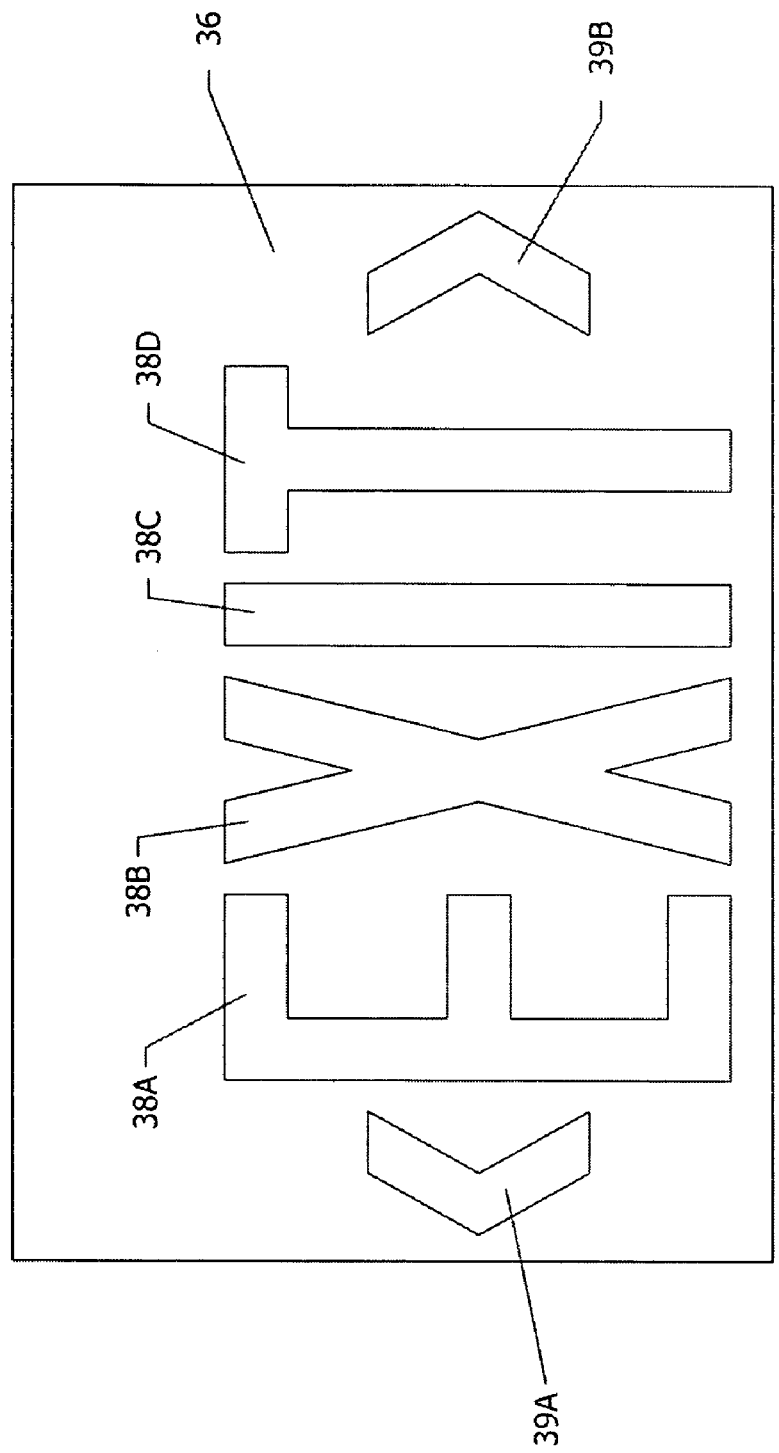
FIG. 1C shows the front face of a stencil defining indicia indicating an exit that is mounted to the mount structure shown in FIG. 1 over the optical diffuser of the selective color LED exit sign shown in FIG. 1B.

FIG. 1B shows in isolation the front view of an optical diffuser 34 known in the art that is secured to housing 14 and positioned over LEDs 32. FIG. 1C shows a rectangular stencil 36 in front view taken in isolation that is secured to housing 14 in assembled mode and positioned over optical diffuser 34, LEDs 32, and rear panel 16. Stencil 36 is also shown in FIG. 1. Stencil 36 is generally non-transparent and includes four light passageway openings 38A, 38B, 38C and 38D that define the four letters, or four indicia, in capitalized mode of the word EXIT, respectively, that extend horizontally in the midarea of stencil 36 through which light beams projected by LEDs 32 pass through each light passageway opening 38A, 38B, 38C and 38D after passing through optical diffuser 34 for eventual viewing by an observer. Stencil 36 optionally defines two directional symbols, namely, opposed chevron arrow openings 39A and 39B through which light beams projected by LEDs 32 pass for eventual viewing by an observer.

Figure 1D:
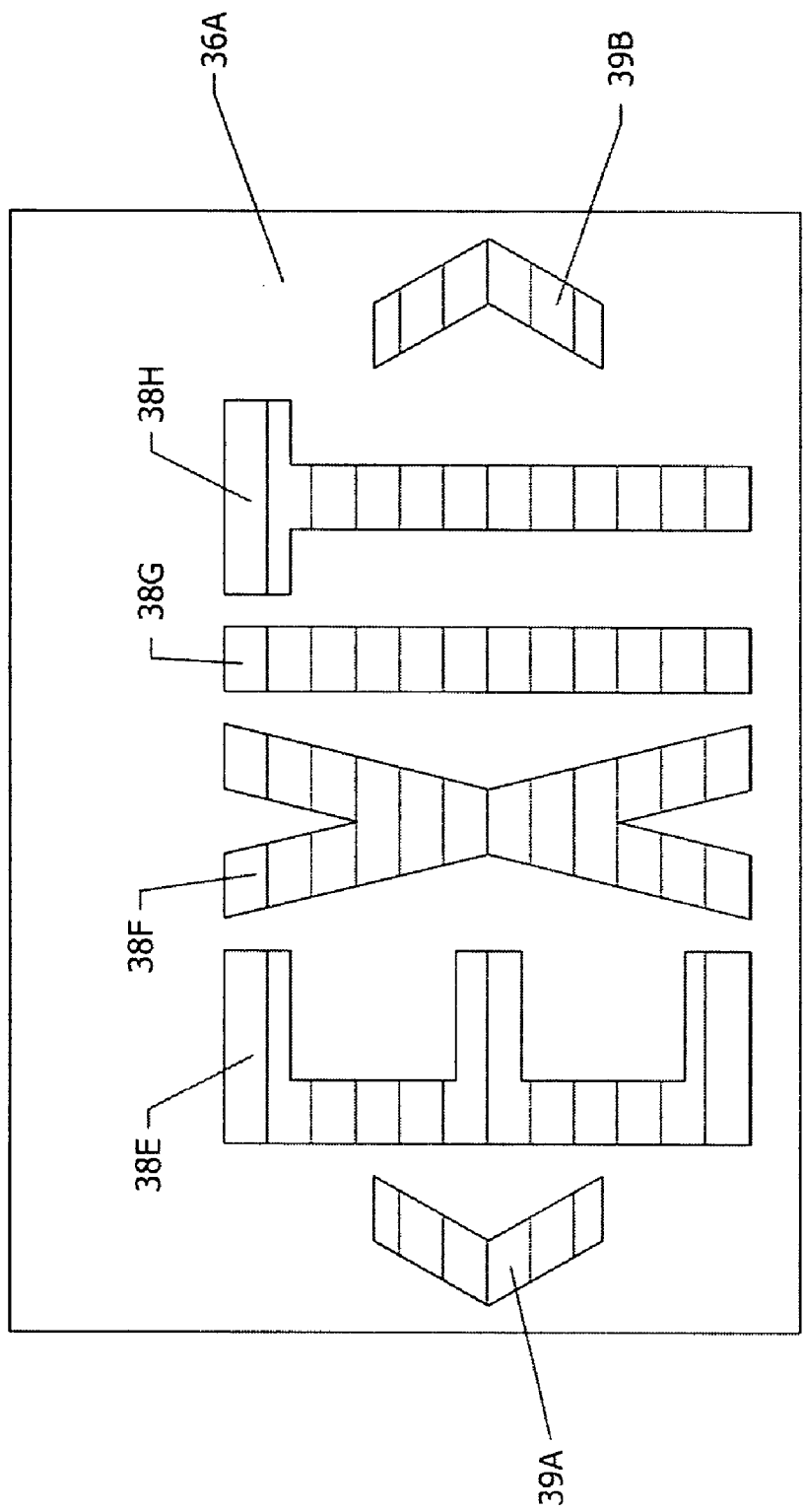
FIG. 1D shows the front face of an alternative stencil.

FIG. 1D shows an alternative embodiment of the rectangular stencil 36, namely stencil 36A in front view taken in isolation that is secured to housing 14 in assembled mode and positioned over optical diffuser 34, LEDs 32, and rear panel 16. Stencil 36A is clear and translucent, but is made non-translucent by a manner known in the art such as by the application of paint or other masking medium. Stencil 36A provides four transparent areas 38E, 38F, 38G, and 38H that define the four letters or four indicia, in capitalized text mode of the word EXIT, respectively, and that extend horizontally in the general midarea of stencil 36A through which light beams projected by LEDs 32 pass through each transparent area 38E, 38F, 38G, and 38H after passing through optical diffuser 34 for eventual viewing by an observer. Stencil 36A optionally includes other transparent areas such as two directional symbols, namely, opposed chevron arrows 39A and 39B through which light beams projected by LEDs 32 pass for eventual viewing by an observer. Other variations of stencils 36 and 36A are possible within the parameters of the present invention. It should be noted that the alternative stencil 36A itself could be manufactured out of a diffusion material thereby further reducing parts by eliminating the need for a separate optical diffuser 34.

Figures 2, 2A:
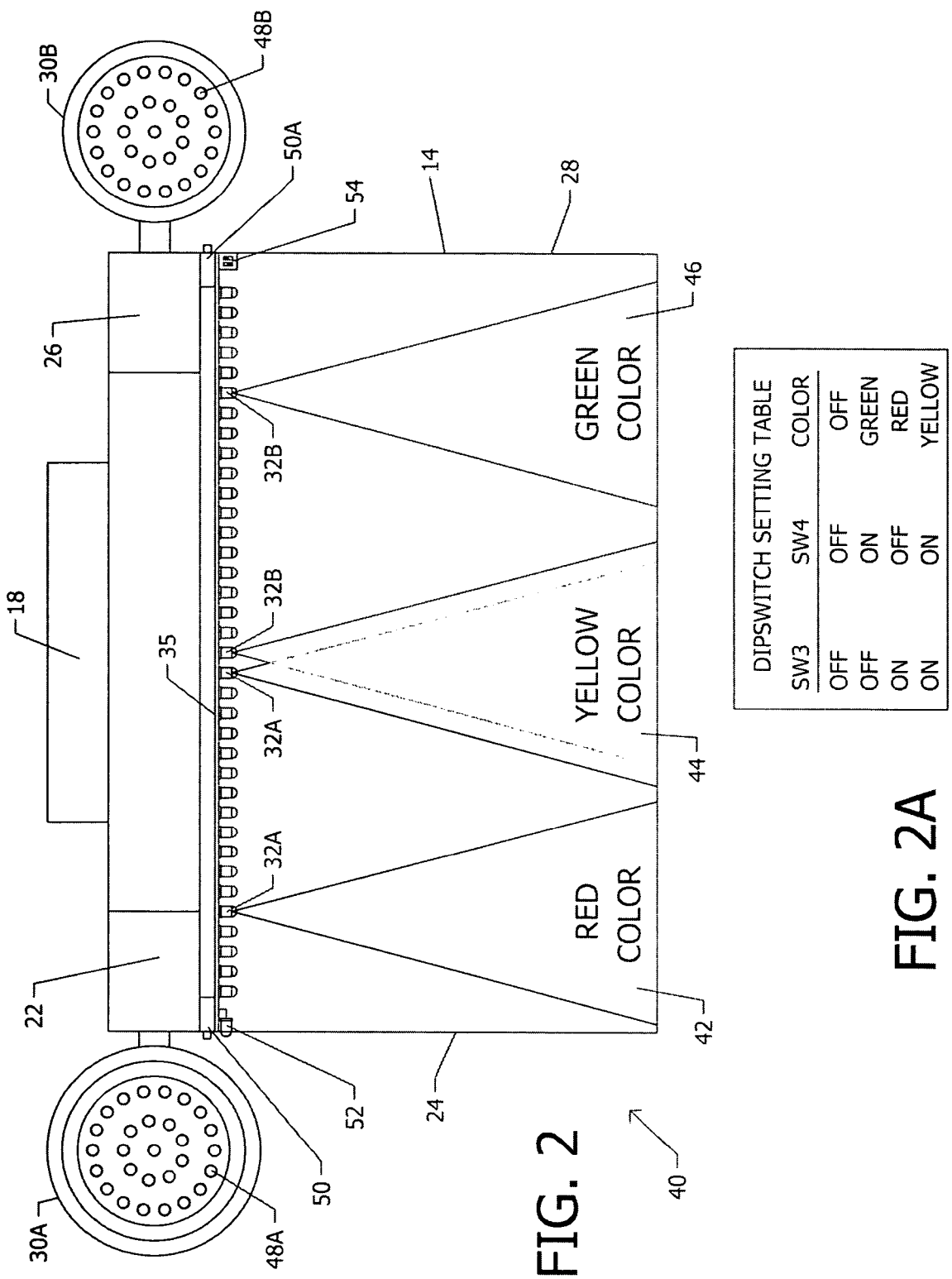
FIG. 2 shows the selective color LED exit sign as shown in FIG. 1 in a simplified form showing one each of a red and green light beam and one mixed yellow light beam from the combination of the one red with the one green light beam.
FIG. 2A shows a chart of the typical dipswitch selections as related to FIG. 2.

FIG. 2 shows a more detailed view 40 of the disassembled front view 12 shown in FIG. 1A and wherein thirty-six monochrome color LEDs 32 include for purposes of exposition twelve red LEDs 32A and twenty-four green LEDs 32B each individually mounted to and electrically connected to a circuit board 35 that is attached to housing 14. The relative numbers of LEDs 32A and 32B can vary. For example, equal numbers of red LEDs 32A and green LEDs 32B can be used. As shown in FIG. 2, the arrangement of thirty-six LEDs 32 are such that there are two green LEDs 36B located between every red LED 36A with a green LED 36B positioned at each end of the total array of thirty-six LEDS 32. The actual number of red color LEDs 32A and green color LEDs 36B can vary depending on the make and type of LED 32 used as determined by the output beam angle and the output lumen generated by each LED 32. For purposes of exposition a single red color beam 42 is produced from a single red LED 32A and a single green color beam 46 is produced from a single green LED 32B. A single yellow color beam 44 is produced from a combination of the red color beam 42 emitted from red LED 32A with the green color beam 46 emitted from single green LED 32B. Red color beam 42 represents all red color beams and green color beam 46 represents all green color beams, and yellow color beam 44 represents all yellow color beams.

Also seen in FIG. 2 are twenty-eight monochrome LEDs 48A positioned in a concentric circular arrangement in optional emergency light 30A mounted to side edge 24 of housing 14, and twenty-eight monochrome LEDs 48B positioned in a concentric circular arrangement in optional emergency light 30B mounted to side edge 28 of housing 14. A normally closed DC disconnect test switch 50 is positioned on circuit board 35 proximate to LEDs 32 to test the battery backup system, and a DC power status LED 52 is also positioned on circuit board 35. A normally open DC connect test switch 50A is also positioned on circuit board 35, which when closed will connect power to LEDs 48A and 48B in emergency lights 30A and 30B respectively.

A dipswitch 54 containing two separate switches is positioned on circuit board 35 proximate to and in electrical connection to LEDs 32. Dipswitch 54 is in electrical connection to circuitry connected to the circuit board (not shown) and LEDs 32, and is manually operable to select any one of the following options as shown in dipswitch settings table 2A as follows:

1. Deactivation of any color to selective color LED sign 10;
2. Activation of red LEDs 32A so as to produce red color as represented by red beam 42;
3. Activation of green LEDs 32B so as to produce green color as represented by green beam 46;
4. Activation of both red LEDs 32A and green LEDs 32B resulting in the emission of red and green colors that mix to produce yellow light as represented by yellow beam 44.

Figure 3:
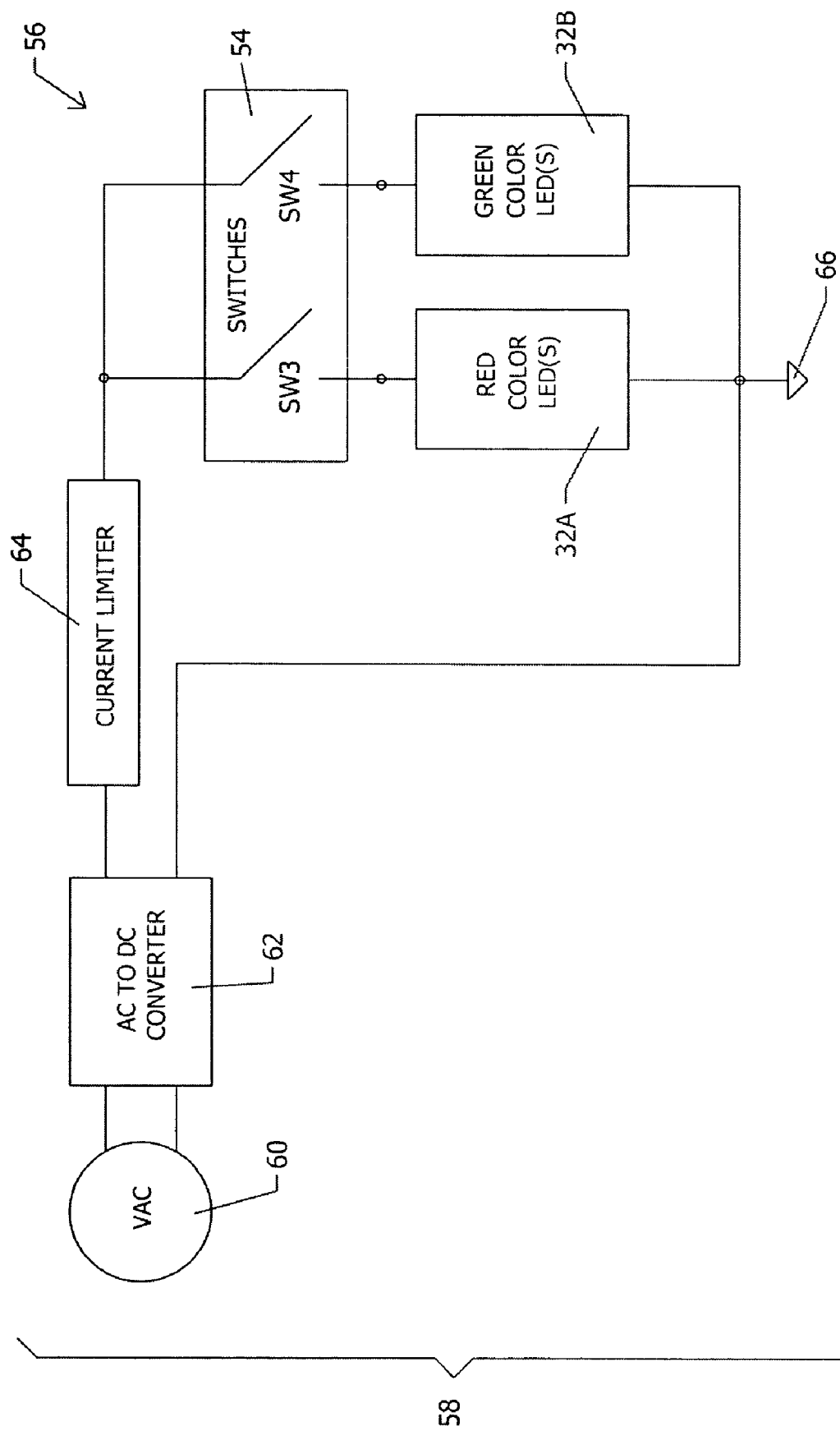
FIG. 3 shows an isolated schematic block diagram of the isolated selective color LED lamp of the selective color LED exit sign shown in FIGS. 1 and 2.

FIG. 3 shows a schematic block diagram 56 of a selective color LED lamp 58 taken in isolation. Selective color LED lamp 58 can be used in retrofit applications for existing illuminated signs or as the main selective color LED lamp in new fixtures. LED lamp 58 basically comprises an alternating current voltage (VAC) power input 60 that is readily converted into a DC voltage output to power red and green color LEDs 32A and 32B, respectively, by an AC to DC converter 62.

A single main or individual current limiter, or resistor 64, is used to limit the current going into red LEDs 32A and green LEDs 32B. Red LEDs 32A and green LEDs 32B comprise of LEDs 32 connected in both a series and a parallel configuration for redundancy. This is done so that the majority of red LEDs 32A and green LEDs 32B will remain energized in the event that one or more LEDs 32 in each array should fail.

Each of the red LEDs 32A and green LEDs 32B are in direct communication with a two-position dipswitch 54 previously discussed that is manually operable to close the power supply circuit and thereby energize all the red LEDs 32A and green LEDs 32B. Red LEDs 32A can be energized independent of green LEDs 32B, and vice versa. In the event that both red LEDs 32A and green LEDs 32B are switched on and energized, a third color, namely, the color yellow, will appear resulting from the combination of the mixing of the output color beams from red LEDs 32A with green LEDs 32B. Activated LEDs 32 are connected to ground 66 thereby completing the current path through red LEDs 32A and green LEDs 32B respectively.

Figure 4:
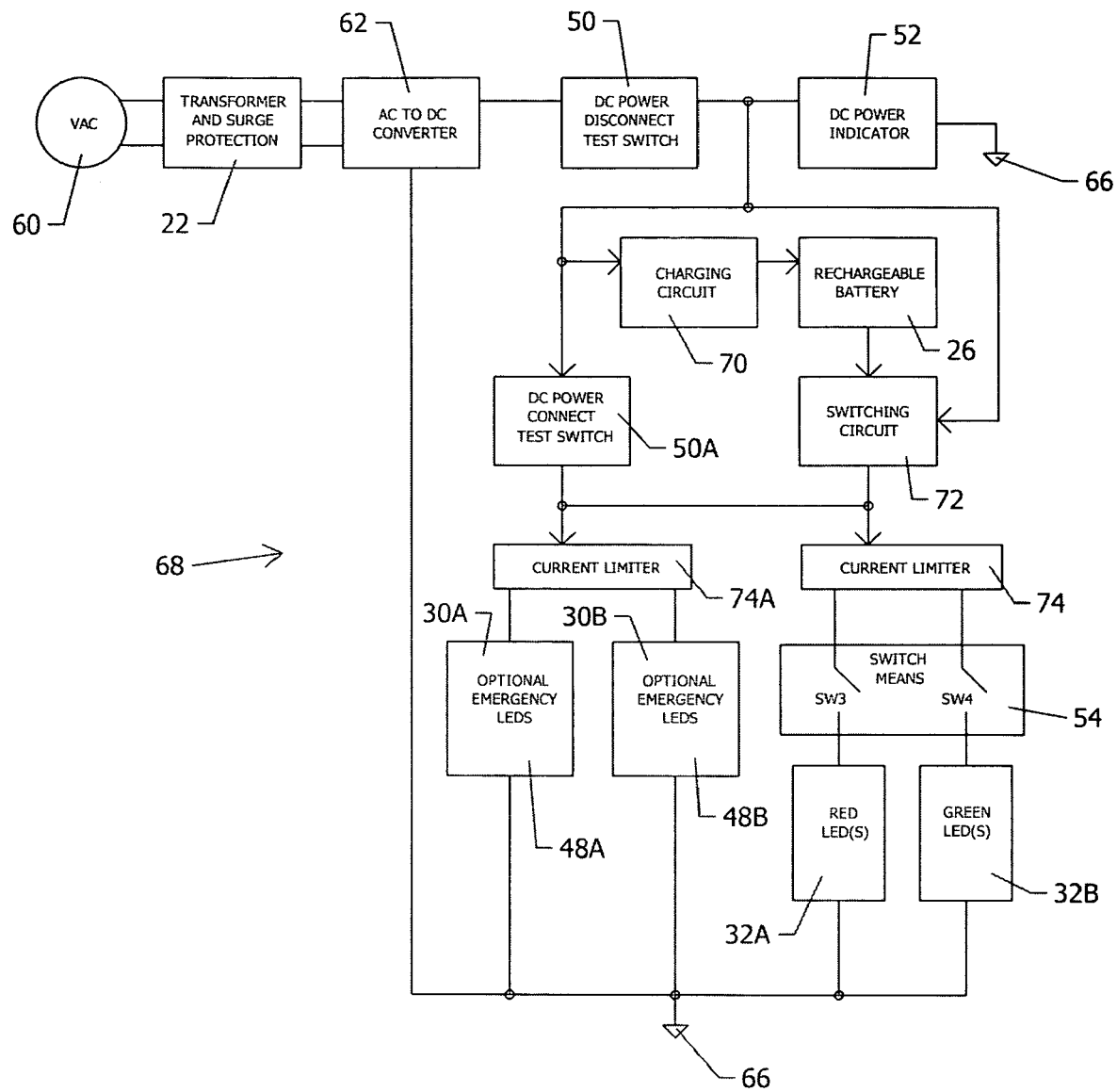
FIG. 4 shows a schematic block diagram of the selective color LED exit sign shown in FIGS. 1 and 2 including the selective color LED lamp shown in FIG. 3.

FIG. 4 shows a schematic block diagram 68 of exit sign 10. The usual source of power to an emergency exit sign is alternating current voltage or VAC 60. This voltage can be 120V, 240V, or 277V. Since the input AC voltage is high, a step-down transformer typified by step-down transformer 22 also shown in FIG. 2 is used to bring the input voltage down to a lower operating AC voltage, for example 8 VAC. The 8 VAC is then passed through AC/DC converter 62 typically a bridge rectifier.

The direct current voltage or VDC is then connected to a momentary DC power disconnect test switch 50 that is normally closed. The function of DC power disconnect test switch 50 is to test the electronic circuitry of the backup system to battery 26 by simulating the interruption of DC voltage power. DC power indicator LED 52 signals the presence of AC voltage power.

The DC voltage also goes through a charging circuit 70 connected to rechargeable battery 26 and then to a switching circuit 72. The output of switching circuit 72 then goes through a main or individual current limiter 74, and lastly to red LEDs 32A and green LEDs 32B. The function of switching circuit 72 is to provide power to red LEDs 32A and green LEDs 32B when normal input DC voltage is present, but will automatically switch over to battery backup 26 DC power in the event of input AC power failure. As described before two-position dipswitch 54 is operable to turn either or both red LEDs 32A and green LEDs 32B on and off.

Two separate monochrome LED lights 30A and 30B, respectively, act as optional emergency lights. The LEDs 48A and 48B for use in emergency LED lights 30A and 30B are monochrome comprising either white and/or yellow color LEDs. They are optional and serve as emergency lighting for the egress and evacuation of buildings or other establishments in the event of power failure and general lighting is not available. A separate DC power connect test switch 50A energizes the optional emergency monochrome LEDs 48A and 48B. The output of switching circuit 72 also goes through current limiter 74A and then to monochrome LEDs 48A and 48B.

Momentary DC power status connect switch 50A is normally open and when depressed will connect the DC voltage power directly to test optional emergency lights 30A and 30B. In the absence of AC voltage power or when the DC power disconnect test switch 50 is depressed, backup battery 26 voltage power will kick in to power both red LEDs 32A and green LEDs 32B as well as providing power for LEDs 48A and 48B in optional emergency lights 30A and 30B. The storage capacity of backup battery 26 should provide enough reserve voltage to power all the LEDs in exit sign 10, including optional emergency lights 30A and 30B for a duration of 1.5 to 3.0 hours when there is no AC voltage input. Red LEDs 32A and green LEDs 32B and LEDs 48A and 48B in emergency LED lights 30A and 30B are connected to ground 66 thereby completing the current paths through red LEDs 32A and green LEDs 32B and LEDs 48A and 48B in emergency LED lights 30A and 30B.

Figure 5:
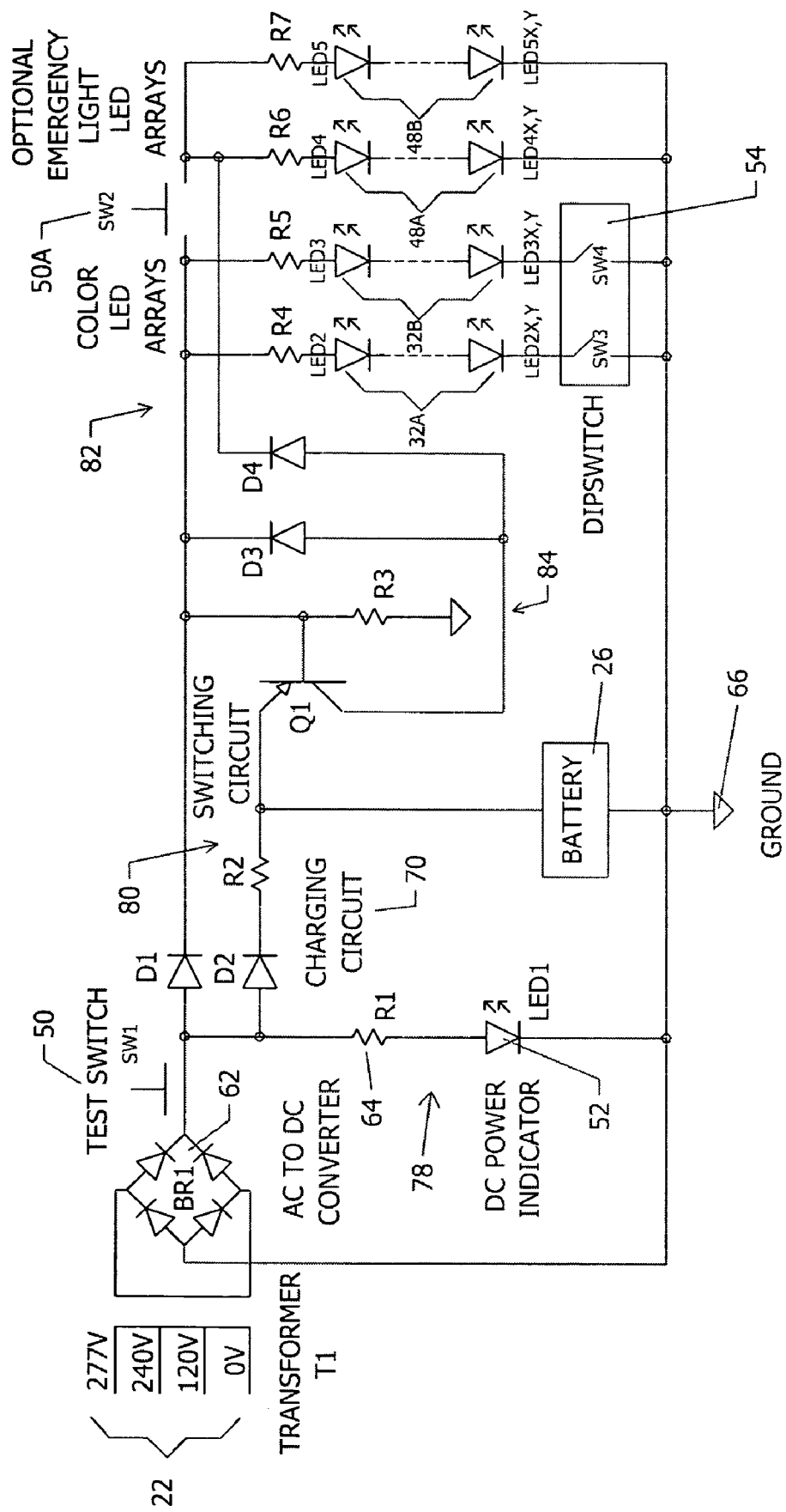
FIG. 5 shows the electrical circuit used for the selective color LED exit sign.

FIG. 5 depicts the electrical circuit used for selective color LED exit sign 10. Step-down transformer 22 shown here as T1 has multiple primary input voltage taps depending on the voltage available. As mentioned before, these may be 120 volts, 240 volts, or 277 volts AC. The secondary output voltage of transformer 22 is the same at about 8 volts AC, also as mentioned before. The 8 volts AC are attached to the AC inputs of AC/DC converter 62 shown here as a bridge rectifier BR1. The negative output of bridge rectifier BR1 becomes the DC ground 66, while the positive output of bridge rectifier BR1 serves to deliver power to four main circuits by way of the normally closed momentary test switch 50 shown here as SW1.

A first circuit 78 passes DC voltage through current limiter 64, shown here as resistor R1, that limits current to DC power indicator LED 52, also indicated as LED1. One end of resistor R1 is connected to the anode of power indicator LED 52, and the cathode of power indicator LED 52 (LED1) is connected to DC ground 66. DC power indicator LED 52 lights up when AC input voltage is present and test switch 50 (SW1) is not depressed. Due to the fact that power indicator LED 52 (LED1) is by nature a diode itself, it prevents reverse current flow from DC ground 66 back to the positive DC output of bridge rectifier BR1. Therefore current flows only in one direction from the anode of DC power indicator LED 52 (LED1) to the cathode of DC power indicator LED 52 (LED1).

A second circuit 80 represents the charging circuitry 70 for delivering power to rechargeable battery 26 (BATTERY) for backup power in case of AC input voltage failure. DC voltage passes through diode D2 into resistor R2 and directly into the positive terminal of battery 26 (BATTERY). The negative terminal of battery 26 (BATTERY) is connected to DC ground 66. Diode D2 prevents the reverse current flow from battery 26 (BATTERY) back to the positive DC output of bridge rectifier BR1, and therefore allows current to flow only in one direction from the anode of diode D2 to the cathode of diode D2.

Third circuit 82 includes a complete array of red LEDS 32A as shown in FIG. 5 comprising individual red LEDs, namely, LED2 to LED2X,Y connected in an electrical series and parallel configuration for redundancy. Third circuit 82 also includes a complete array of green LEDs 32B as shown in FIG. 5 comprising individual green LEDS, namely, LED3 to LED3X,Y also connected in an electrical series and parallel configuration. This identification of red and green LEDs sets forth that red LEDs 32A and green LEDs 32B can each comprise of at least one red LED and at least one green LED connected in an electrical serial and parallel configuration.

In addition, third circuit 82 includes monochrome LEDs 48A and 48B. LEDs 48A is shown in FIG. 5 as comprising of individual monochrome LEDs, namely, LED4 to LED4X, Y, and LEDs 48B is shown in FIG. 5 as comprising of individual monochrome LEDs, namely, LED5 to LED5X,Y. This identification of individual monochrome LEDs sets forth that LEDs 48A and 48B can each comprise of at least one monochrome LED in an electrical serial and parallel configuration.

The actual number of red LEDs 32A and green LEDs 32B and monochrome LEDs 48A and 48B in optional emergency lights 30A and 30B can be the same number or can differ in number.

Third circuit 82 drives red LEDs 32A, namely, LED2 to LED2X,Y and green LEDs 32B, namely, LED3 to LED3X,Y during normal operation when input AC voltage is present and test switch 50 (SW1) is not depressed. DC voltage passes through diode D1 from the anode side to the cathode side. Diode D1 prevents the reverse current flow from LEDs 32A and 32B back to the positive DC output of bridge rectifier BR1, and therefore allows current to flow only in one direction from the anode of diode D1 to the cathode of diode D1. DC voltage passes to red LEDs LED2 to LED2X,Y by way of resistor R4. Likewise DC voltage passes to green LEDs LED3 to LED3X,Y by way of resistor R5. Resistors R4 and R5 provide current limiting to the individual red LEDs 32A and green LEDs 32B respectively. Red and green LEDs LED2 to LED2X,Y and LED3 to LED3X,Y each have at least one color LED connected in a series and parallel configuration for redundancy. The cathode of the last LED2X,Y of the red LEDs 32A is connected to one side of the first switch of two-position dipswitch 54 (SW3) with the other side of the first switch of two-position dipswitch 54 (SW3) connected to DC ground 66. Likewise, the cathode of the last LED3X,Y of green LEDs 32B is connected to one side of the second switch of two-position dipswitch 54 (SW4) with the other side of the second switch of two-position dipswitch 54 (SW4) connected to DC ground 66. When either switch on two-position dipswitch 54 (SW3 or SW4) is switched to the ON position, the cathode of the corresponding LED2X,Y or LED3X,Y relating to the first or second switch, respectively, will in effect be connected to DC ground 66. This completes the respective circuit and will energize all the corresponding red LEDs 32A and/or green LEDs 32B LED arrays.

Normally open momentary power connect test switch 50A (SW2) is provided to test and turn on optional emergency LED lights 30A and 30B by providing temporary DC voltage power from the positive output of bridge rectifier BR1. The DC voltage passes to LEDs 48A, namely, LED4 to LED4X,Y by way of resistor R6. Likewise DC voltage passes to LEDs 48B, namely, LED5 to LED5X,Y by way of resistor R7. Resistors R6 and R7 provide current limiting to the individual LEDs 48A and 48B in optional emergency LED lights 30A and 30B. LEDs LED4 to LED4X,Y and LED5 to LED5X,Y each comprise of at least one LED connected in a series and parallel configuration for redundancy. The cathodes of LED 4X,Y and LED5X,Y are each connected to DC ground 66.

A fourth circuit 84 provides the automatic switching of DC voltage power to LEDs 32A, 32B, 48A, and 48B in the event of AC power failure. The positive terminal of battery 26 is connected to the emitter of PNP transistor Q1. The collector of transistor Q1 is connected to the inputs of red and green LED arrays 32A and 32B by way of diode D3 and also to the inputs of monochrome LEDs 48A and 48B in optional emergency lights 30A and 30B by way of diode D4. Diodes D3 and D4 prevent the reverse current flow from the individual diode arrays back through transistor Q1 into the positive terminal of battery 26, and likewise back to the positive DC output of bridge rectifier BR1, thus allowing current to flow only in the directions from the anodes of diodes D3 and D4 to the cathodes of diodes D3 and D4 respectively. The base of transistor Q1 is properly biased through resistor R3 to DC ground 66 and the cathode of diode D1 such that transistor Q1 remains off and does not conduct when DC power is present at the positive DC output of bridge rectifier BR1. When there is an absence of DC power at the positive DC output of bridge rectifier BR1 as a result of AC power failure or if power disconnect test switch 50 (SW1) is depressed, the base of transistor Q1 will cause transistor Q1 to conduct and allow the DC voltage from battery 26 to flow from the positive terminal of backup battery 26 through transistor Q1 from the emitter to the collector and through diode D3 to power red LEDs 32A and green LEDs 32B, and also to flow through diode D4 to power monochrome LEDs 48A and 48B in optional emergency light LED lights 30A and 30B.

Figure 6:
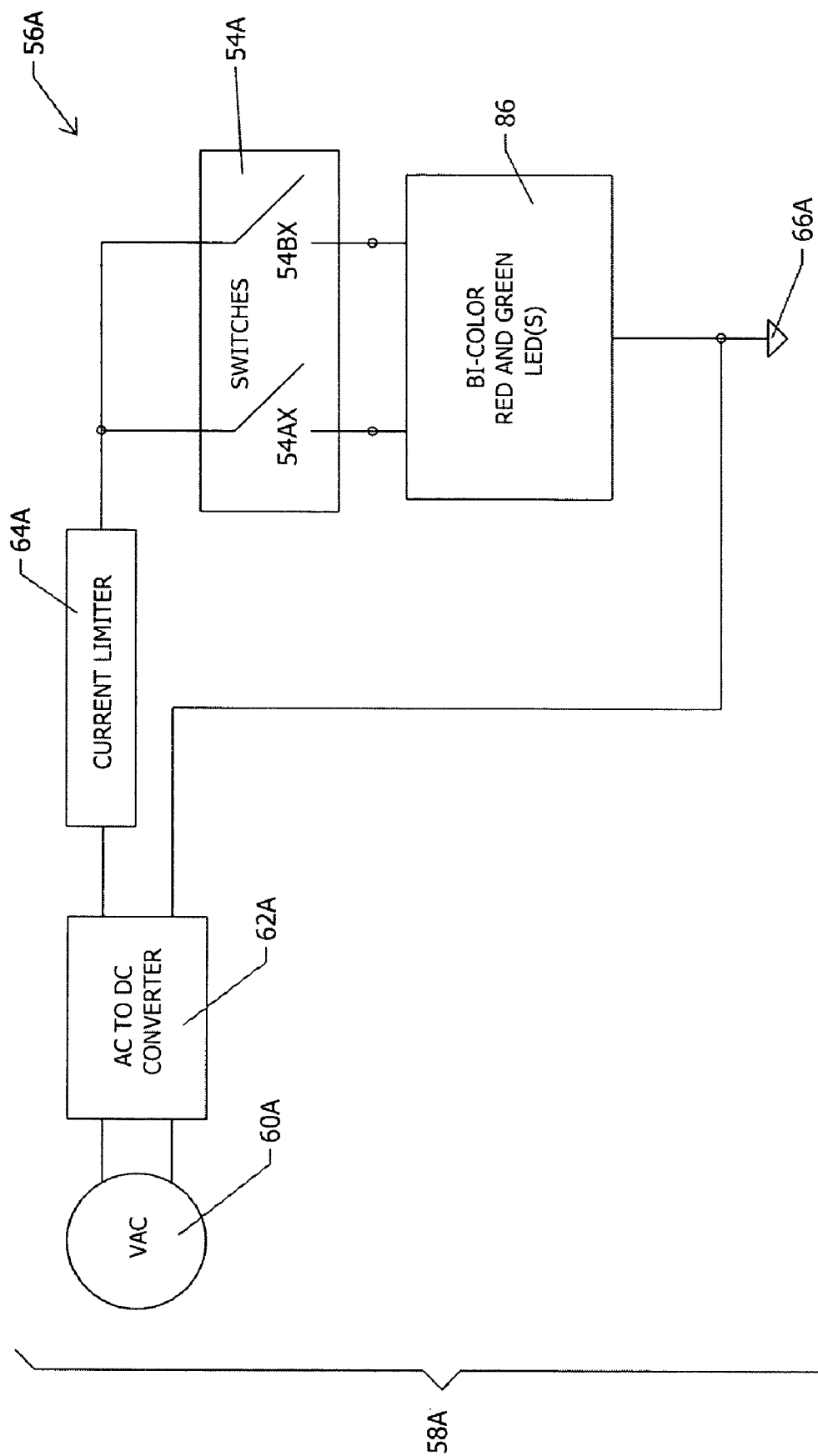
FIG. 6 is a schematic block diagram analogous to FIG. 3 that shows an alternative selective color LED lamp with bicolor red and green LEDs.

FIG. 6 shows a schematic block diagram 56A of a selective bicolor LED lamp 58A taken in isolation. Selective bicolor LED lamp 58A is an alternative embodiment to selective color LED lamp 58 shown in FIG. 3. Selective bicolor LED lamp 58A can be used in retrofit applications for existing illuminated signs or as the main selective color LED lamp in new fixtures. LED lamp 58A includes alternating current voltage (VAC) power input 60A that is converted by AC to DC converter 62A, analogous to AC/DC converter 62 shown in FIG. 3, into a direct current DC voltage output. A single main or individual current limiter, or resistor 64A, is used to limit the current going into the bicolor LED consisting of a red and a green LED die having separate anodes and sharing a common cathode. Bicolor red and green LED 86 is analogous to monochrome red LEDs 32A and green LEDs 32B of selective color sign 10.

A current limiter, or resistor, 64A, which is analogous to current resistor 64 of LED lamp 58, is in direct current communication with a two-position dipswitch 54A, which is analogous in operation to dipswitch 54 discussed before and now relative to selective color LED lamp 58A, is manually operable to close the power supply circuit. Dipswitch 54A is in turn in direct current communication with bicolor red and green LED 86. Current limiter 64A thus limits the current to red and green bicolor LED 86. Bicolor LED 86 may comprise a plurality of bicolor LEDs 86 connected in both a series and a parallel configuration for redundancy. This is done so that the majority of red and green bicolor LEDs 86 will remain energized in the event that one or more bicolor LEDs 86 in each array should fail. Red colors and green colors of bicolor LED 86 can be energized independently of one another by dipswitch 54A. When both the red and green colors of bicolor LED 86 are switched on and energized, a third color, namely, the color yellow, will be produced from the color mixing of the output color emissions of the color red with the color green. Bicolor LED 86 is connected to DC ground 66A. Dipswitch 54A comprises two operational internal switches 54AX and 54BX. Internal switch 54AX is capable of contact with the red color of bicolor LED 86, specifically to the anode(s) of the LED die(s) for red colors while the cathode(s) of the color red of LED 86 is tied directly to DC ground 66A. Internal switch 54BX is capable of contact with the green color of bicolor LED 86, specifically to the anode(s) of the LED die(s) for green colors while the cathode(s) of the color green of LED 86 is tied directly to DC ground 66A.

Selective color LED lamp 58A allows the use of a single or multiple bicolor LEDs, that is, a single or multiple red and green bicolor LED(s) such that the entire package of an alternative to selective color LED sign 10 that includes separate anodes and a common cathode can be manufactured as an alternative to the individual and discrete red and green LEDs set forth and described herein for selective color LED lamp 58. Thus the bicolor LED(s) 86 of FIG. 6 each contain red and green LED dies that can be selectively energized independent of each other so as to cause the emission of the color red or the color green, or can be energized simultaneously to emit red color and green color to produce the color yellow.

Although the present invention has been described in some detail by way of illustration and example for purposes of clarity and understanding, it will, of course, be understood that various changes and modifications may be made in the form, details, and arrangements of the parts without departing from the scope of the invention set forth in the following claims.

What is claimed is:
1. An exit sign comprising:
a housing,
a plurality of LEDs having the capability of being selectively activated to produce either red light or green light, said plurality of LEDs being mounted in mutual lighting association in said housing, means for selective activation of said plurality of LEDs to produce either said red light or said green light, means for passing light from selected said red light or selected said green light in the form of indicia symbolizing an exit enabling viewing by an observer, wherein said means for passing light is a stencil, means for optically diffusing said light positioned in said housing juxtapositioned to said plurality of LEDs and said stencil, DC circuitry in operative electrical connection with said plurality of LEDs, and a source of DC electrical power activating said DC circuitry.

2. The exit sign according to claim 1, wherein said plurality of LEDs further having the capability of being selectively activated by said means for selective activation to simultaneously emit both said red light and said green light so as to produce yellow light, and wherein said means for selective activation of said plurality of LEDs to produce both of said red light and said green light includes means to produce both said red light and said green light so as to produce said yellow light, wherein said yellow light passes through said stencil enabling viewing of said indicia by an observer.

3. The exit sign according to claim 1, wherein said plurality of LEDs includes a plurality of monochrome red LEDs and a plurality of monochrome green LEDs, each said monochrome red LED having the capability of being activated by said means for selective activation to produce said red light, and each said monochrome green LED having the capability of being activated by said means for selective activation to produce said green light.

4. The exit sign according to claim 1, wherein said plurality of LEDs includes a plurality of bicolor LEDs, each said bicolor LED having the capability of being activated by said means for selective activation to produce either said red light or said green light.

5. The exit sign according to claim 1, wherein said means for optically diffusing said light is an optical diffuser.

6. The exit sign according to claim 1, wherein said stencil is a non-transparent stencil defining light passageway openings forming said indicia, said light passing through said light passageway openings enabling viewing of said indicia by an observer.

7. The exit sign according to claim 1, wherein said stencil is a translucent stencil having non-transparent areas and transparent areas, said transparent areas forming said indicia, said light passing through said transparent areas enabling viewing of said indicia by an observer.

8. The exit sign according to claim 1, wherein said indicia symbolizing an exit is four independent letters forming the word EXIT.

9. The exit sign according to claim 1, wherein said indicia symbolizing an exit includes at least one symbol indicating an exit.

10. The exit sign according to claim 1, further including means for passing light from selected said red light or selected said green light in the form of at least one directional symbol enabling viewing by an observer.

11. The exit sign according to claim 1, wherein said means for selective activation to produce either of said red light or said green light is a two-position DIP switch.

12. The exit sign according to claim 11, wherein said two-position DIP switch includes the capability to simultaneously activate both said red light and said green light so as to produce yellow light.

13. The exit sign according to claim 1, further including battery means for providing emergency DC power to said plurality of LEDs in the event of failure of electrical DC power.

14. The exit sign according to claim 13, further including means for providing emergency light including a plurality of monochrome LEDs, said means for producing emergency light being in electrical connection to said battery means.

15. An exit sign comprising:

a housing, a plurality of monochrome red LEDs and a plurality of monochrome green LEDs having the capability of being selectively activated to produce either red light or green light, said plurality of monochrome red LEDs and said monochrome green LEDs being mounted in mutual lighting association in said housing, means for selective activation of either said plurality of monochrome red LEDs to produce said red light or said plurality of monochrome green LEDs to produce said green light, means for passing light from selected said red light or selected said green light in the form of indicia symbolizing an exit enabling viewing by an observer, wherein said means for passing light is a stencil, means for optically diffusing said red light or said green light positioned in said housing juxtapositioned to said plurality of monochrome red LEDs and said plurality of monochrome green LEDs and said stencil, DC circuitry in operative electrical connection with said plurality of monochrome red LEDs and said plurality of monochrome green LEDs, and a source of DC electrical power activating said DC circuitry.

16. The exit sign according to claim 15, wherein said plurality of monochrome red LEDs and monochrome green LEDs have the capability of being selectively activated by said means for selective activation to simultaneously emit both said red light and said green light so as to produce yellow light, wherein said yellow light passes through said stencil enabling viewing of said indicia by an observer.

17. The exit sign according to claim 15, wherein said stencil is a non-transparent stencil defining light passageway openings forming said indicia, said light passing through said light passageway openings enabling viewing of said indicia by an observer.

18. The exit sign according to claim 15, wherein said stencil is a translucent stencil having non-transparent areas and transparent areas, said transparent areas forming said indicia, said light passing through said transparent areas enabling viewing of said indicia by an observer.

19. The exit sign according to claim 15, wherein said indicia symbolizing an exit is four independent letters forming the word EXIT.

20. The exit sign according to claim 15, wherein said indicia symbolizing an exit includes at least one symbol indicating an exit.

21. The exit sign according to claim 15, further including means for passing light from selected said red light or selected said green light in the form of at least one directional symbol enabling viewing by an observer.

22. The exit sign according to claim 15, wherein said means for selective activation of said plurality of LEDs to produce either said red light and said green light is a two-position DIP switch.

23. The exit sign according to claim 22, wherein said two-position DIP switch includes the capability to simultaneously activate both said red light and said green light so as to produce yellow light.

24. The exit sign according to claim 15, wherein said means for optically diffusing said red and green light is an optical diffuser.

25. The exit sign according to claim 15, further including battery means for providing emergency DC power to said plurality of monochrome red LEDs and said plurality of monochrome green LEDs in the event of failure of electrical DC power.

26. The exit sign according to claim 15, further including means for providing emergency light including a plurality of monochrome LEDs, said means for producing emergency light being in electrical connection to said battery means.

27. An exit sign comprising:
a housing,
a plurality of bicolor red and green LEDs having the capability of being selectively activated to produce either red light or green light, said plurality of bicolor red and green LEDs being mounted in mutual lighting association in said housing;
means for selective activation of said plurality of bicolor LEDs to produce either said red light or said green light,
means for passing light from selected said red light or selected said green light in the form of indicia symbolizing an exit enabling viewing by an observer, wherein said means for passing light is a stencil,
means for optically diffusing said red light or said green light positioned in said housing juxtapositioned to said plurality of bicolor red and green LEDs and said stencil,
DC circuitry in operative electrical connection with said plurality of bicolor red and green LEDs, and
a source of DC electrical power activating said DC circuitry.

28. The exit sign according to claim 27, wherein said plurality of bicolor red and green LEDs have the capability of being selectively activated by said means for selective activation to simultaneously emit both said red light and said green light so as to produce yellow light, wherein said yellow light passes through said stencil enabling viewing of said indicia by an observer.

29. The exit sign according to claim 27, wherein said stencil is a non-transparent stencil defining light passageway openings forming said indicia, said light passing through said light passageway openings enabling viewing of said indicia by an observer.

30. The exit sign according to claim 27, wherein said stencil is a translucent stencil having non-transparent areas and transparent areas, said transparent areas forming said indicia, said light passing through said transparent areas enabling viewing of said indicia by an observer.

31. The exit sign according to claim 27, wherein said indicia symbolizing an exit is four independent letters forming the word EXIT.

32. The exit sign according to claim 27, wherein said indicia symbolizing an exit includes at least one symbol indicating an exit.

33. The exit sign according to claim 27, further including means for passing light from selected said red light or selected said green light in the form of at least one directional symbol enabling viewing by an observer.

34. The exit sign according to claim 27, wherein said means for selective activation of said plurality of bicolor LEDs to produce either said red light or said green light is a two-position DIP switch.

35. The exit sign according to claim 34, wherein said two-position DIP switch includes the capability to simultaneously activate both said red light and said green light of said plurality of bicolor red and green LEDs so as to produce yellow light.

36. The exit sign according to claim 27, wherein said means for optically diffusing said red and green light is an optical diffuser.

37. The exit sign according to claim 27, further including battery means for providing emergency DC power to said plurality of bicolor red and green LEDs in the event of failure of electrical DC power.

38. The exit sign according to claim 27, further including means for providing emergency light including a plurality of monochrome LEDs, said means for producing emergency light being in electrical connection to said battery means.

* * * * *